US010105997B2

(12) United States Patent
Fenkanyn et al.

(10) Patent No.: US 10,105,997 B2
(45) Date of Patent: Oct. 23, 2018

(54) INTEGRATED TPMS MODULE AND RFID TAG DATA SHARING SYSTEM IN A TIRE

(71) Applicant: The Goodyear Tire & Rubber Company, Akron, OH (US)

(72) Inventors: John Michael Fenkanyn, Akron, OH (US); Peter Jung-min Suh, Copley, OH (US); Amrita Patel, Greenville, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/975,980

(22) Filed: Dec. 21, 2015

(65) Prior Publication Data

US 2017/0174013 A1  Jun. 22, 2017

(51) Int. Cl.
*B60C 23/04* (2006.01)
*B60C 19/00* (2006.01)
*B60C 23/20* (2006.01)

(52) U.S. Cl.
CPC .......... *B60C 23/0415* (2013.01); *B60C 19/00* (2013.01); *B60C 23/04* (2013.01); *B60C 23/0483* (2013.01); *B60C 23/20* (2013.01); *B60C 2019/004* (2013.01)

(58) Field of Classification Search
CPC ............ B60C 23/0408; B60C 23/0415; B60C 23/0433; B60C 23/0444; B60C 23/0493; B60C 23/20; B60C 19/00; B60C 2019/004; B29D 2030/0072
See application file for complete search history.

(56) References Cited

U.S. PATENT DOCUMENTS

| | | | | |
|---|---|---|---|---|
| 5,301,553 A | * | 4/1994 | Schultz | B60C 23/009 73/146.5 |
| 5,483,826 A | * | 1/1996 | Schultz | B60C 23/009 340/445 |
| 5,728,933 A | * | 3/1998 | Schultz | B60C 23/009 73/146.5 |
| 6,357,292 B1 | * | 3/2002 | Schultz | B60C 23/009 73/146.5 |
| 6,384,720 B1 | * | 5/2002 | Juzswik | B60G 17/0195 180/282 |
| 6,441,728 B1 | * | 8/2002 | Dixit | B60C 23/0462 340/442 |
| 6,672,151 B1 | * | 1/2004 | Schultz | B60C 23/009 73/146.5 |
| 8,441,355 B2 | | 5/2013 | Fenkanyn | |
| 2002/0075145 A1 | * | 6/2002 | Hardman | B60C 23/0433 340/442 |
| 2002/0084896 A1 | * | 7/2002 | Dixit | B60C 23/0462 340/447 |

(Continued)

FOREIGN PATENT DOCUMENTS

JP  2003159918 A   6/2003
JP  2006282091 A  10/2006

OTHER PUBLICATIONS

EPO search report received by application dated May 22, 2017.

*Primary Examiner* — Orlando Bousono
(74) *Attorney, Agent, or Firm* — Edward T. Kennedy

(57) ABSTRACT

A standalone tire identification tag and standalone sensor module are mounted to a tire and configured to share and store tire identification and tire parameter-measuring sensor data through a common data sharing interface.

11 Claims, 2 Drawing Sheets

(56) References Cited

U.S. PATENT DOCUMENTS

| | | | | |
|---|---|---|---|---|
| 2002/0092347 A1* | 7/2002 | Niekerk | | B60C 23/009 |
| | | | | 73/146.2 |
| 2002/0126005 A1* | 9/2002 | Hardman | | B60C 23/0433 |
| | | | | 340/442 |
| 2003/0006895 A1* | 1/2003 | Drake | | B60C 23/0408 |
| | | | | 340/445 |
| 2003/0122661 A1* | 7/2003 | Ginman | | B60C 23/0408 |
| | | | | 340/447 |
| 2004/0017291 A1* | 1/2004 | Hardman | | B60C 23/0433 |
| | | | | 340/505 |
| 2005/0087593 A1* | 4/2005 | Benedict | | B60C 23/0493 |
| | | | | 235/375 |
| 2005/0206512 A1* | 9/2005 | Delaporte | | B60C 23/0408 |
| | | | | 340/442 |
| 2006/0190150 A1* | 8/2006 | Milot | | B60C 23/04 |
| | | | | 701/38 |
| 2006/0217914 A1* | 9/2006 | Bertness | | B60C 23/0408 |
| | | | | 702/113 |
| 2007/0069877 A1* | 3/2007 | Fogelstrom | | B60C 23/005 |
| | | | | 340/442 |
| 2007/0135179 A1* | 6/2007 | Hardman | | B60C 23/0433 |
| | | | | 455/574 |
| 2007/0279203 A1* | 12/2007 | Thomas | | B60C 23/068 |
| | | | | 340/447 |
| 2008/0024287 A1* | 1/2008 | Boyle | | B60C 23/0408 |
| | | | | 340/442 |
| 2009/0085571 A1* | 4/2009 | Bertness | | B60C 23/0408 |
| | | | | 324/426 |
| 2010/0090819 A1* | 4/2010 | Benedict | | B60C 23/0408 |
| | | | | 340/447 |
| 2010/0127845 A1* | 5/2010 | Hardman | | B60C 23/0433 |
| | | | | 340/447 |
| 2010/0134269 A1* | 6/2010 | Zhu | | B60C 23/041 |
| | | | | 340/447 |
| 2010/0148986 A1* | 6/2010 | Aunkofer | | B60C 23/0418 |
| | | | | 340/12.5 |
| 2010/0156641 A1* | 6/2010 | Lionetti | | B60C 23/0408 |
| | | | | 340/572.1 |
| 2012/0038492 A1* | 2/2012 | Maggiore | | G07C 5/008 |
| | | | | 340/945 |
| 2012/0166836 A1* | 6/2012 | Hardman | | B60C 23/0433 |
| | | | | 713/320 |
| 2013/0090870 A1* | 4/2013 | Bertness | | B60C 23/0408 |
| | | | | 702/63 |
| 2014/0368327 A1* | 12/2014 | Darrer | | G06K 19/07764 |
| | | | | 340/447 |
| 2016/0339748 A1* | 11/2016 | Lesesky | | B60C 19/00 |
| 2016/0343178 A1* | 11/2016 | Lesesky | | B60C 19/00 |
| 2016/0375733 A1* | 12/2016 | Lesesky | | G06K 19/07758 |
| | | | | 340/442 |
| 2017/0059435 A1 | 3/2017 | Marques et al. | | |

* cited by examiner

… (omitting)

INTEGRATED TPMS MODULE AND RFID TAG DATA SHARING SYSTEM IN A TIRE

FIELD OF THE INVENTION

The invention relates generally to data management for electronic tags and sensor modules incorporated into a tire.

BACKGROUND OF THE INVENTION

RFID electronic tags and TPMS (tire pressure monitoring system) sensors are incorporated into a variety of finished articles or products such as tires. Such RFID tags include the capacity for storing data such as a tire identification number. The data stored within the tag memory is transmitted upon receipt of an interrogation signal from the tag to a remote reader during the tire life cycle to provide useful product identification information. TPMS modules measure tire parameters such as tire pressure and temperature. It is beneficial to integrate the TPMS operation with the operation of a RFID tag in a tire in order to maintain the capability of associating measured tire parameter data with the unique tire identification number throughout the useful life of the tire.

SUMMARY OF THE INVENTION

In an aspect of the invention, an integrated sensor module and RFID tag data sharing system is provided for a tire assembly. The system includes a standalone identification tag mounted to the tire for storing and transmitting an accessible unique tire identification code; a sensor module mounted to the tire and having one or more sensors for measuring one or more tire parameter and transmitting the measured tire parameter data from the sensor(s); and a data sharing interface in the identification tag and in the sensor module whereby the unique tire identification code is accessed and stored by the sensor module from data communication with the identification tag.

In another aspect, the measured tire parameter data is accessible by the identification tag device for transmission to a remote receiver.

According to another aspect, the sensor module is operable to transmit the tire identification code and the identification tag includes at least one tag-based sensor for measuring a tire parameter, and wherein the identification tag shares measured data from the tag-based sensor(s) with the sensor module through the data sharing interface.

BRIEF DESCRIPTION OF THE DRAWINGS

The invention will be described by way of example and with reference to the accompanying drawings in which.

DETAILED DESCRIPTION OF THE INVENTION

Figure 1:
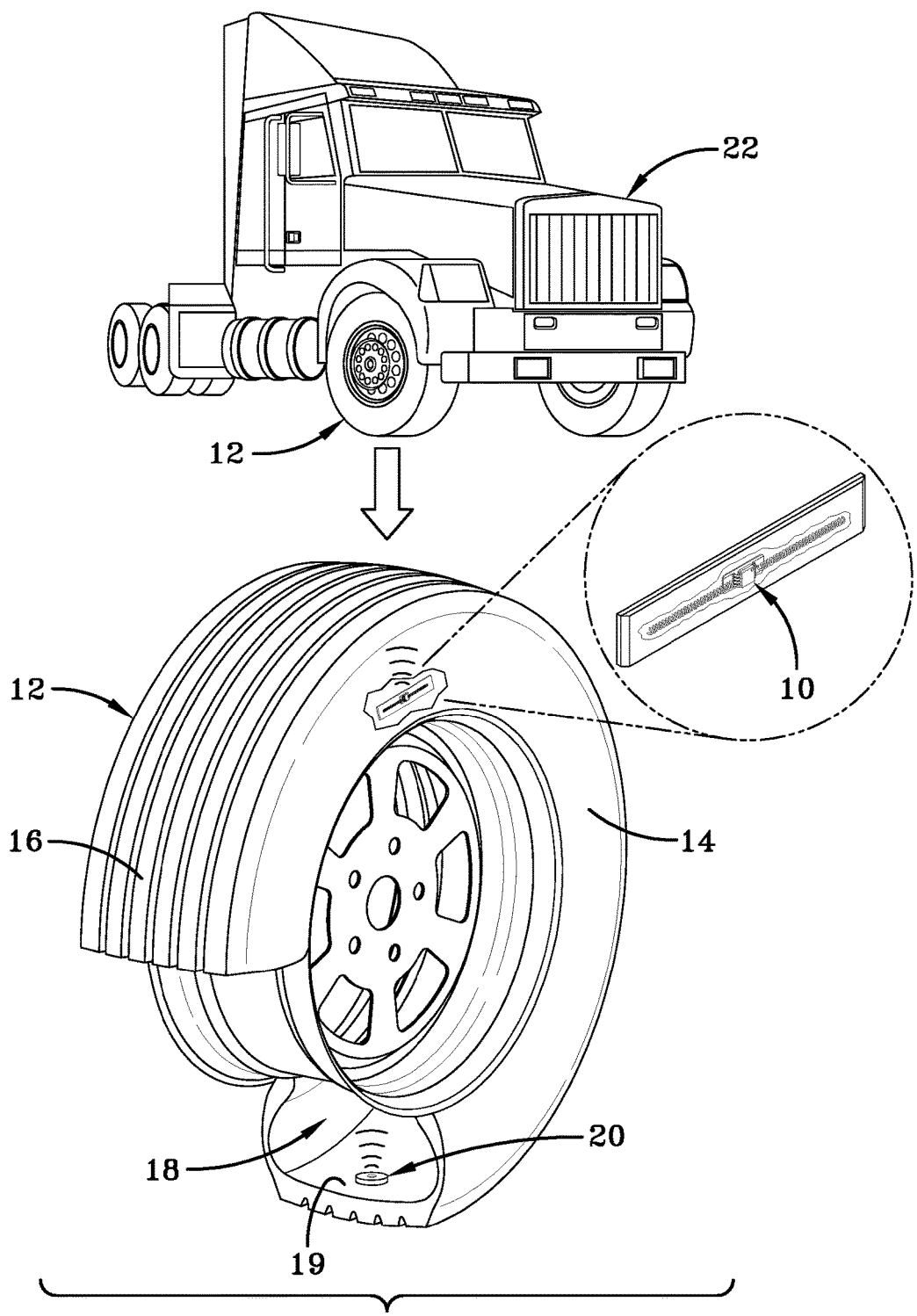
FIG. 1 is a system schematic of a vehicle having a RFID tag and TPMS module equipped tire.

Referring first to FIG. 1, a conventional RFID tag 10 is shown affixed to a sidewall 14 of tire 12. The tag 10, also referred herein as a "tire ID tag", is in a dipole configuration although other tag configurations may be employed if so desired. The RFID tag is of a general type including a substrate supporting an IC (integrated circuit) package and having conductive coiled antenna arms. Such a tag is shown and described in U.S. Pat. No. 8,441,355 hereby incorporated herein in its entirety by reference.

The tag 10 provides a unique tire ID code by which the tire is specifically identified throughout the useful life of the tire. The tire ID code assists in tracking what tires are on vehicles such as the truck 22 and identifying when the tire carrying the tag has been replaced. The tire 12 is of conventional construction having a tread region 16 and tire cavity 18 defined by a tire inner liner 19. The tag 10 is operable to wirelessly transmit the tire ID information to a remote receiver (not shown) for identification purposes.

A tire pressure monitoring sensor (TPMS) module 20 is secured to the tire 12 in communication with the tire cavity 18. The preferred mounting location of the TPMS module 20 is to the tire inner liner 19 by suitable means such as adhesive. The TPMS module 20 generally is a module package in which one or more sensors are packaged for measuring one or more significant tire parameters such as tire cavity air pressure and tire temperature. The measured tire parameters are important to monitor for tire performance and health assessment. Accordingly, the TPMS module 20 is equipped with an antenna for wirelessly transmitting tire parameter data or information to a remote receiver for analysis. The TPMS module 20 and the tire tag 10 are devices that are generally commercially available. The devices 10, 20 are modified hereby to communicate date with one another as herein described.

The tire 12 mounts to a vehicle 22 shown in the form of a truck tractor. However, the principles of data sharing and multiple standalone device integration described herein are equally applicable to other types of vehicles such as passenger cars, off-road equipment, etc.

Figure 2:
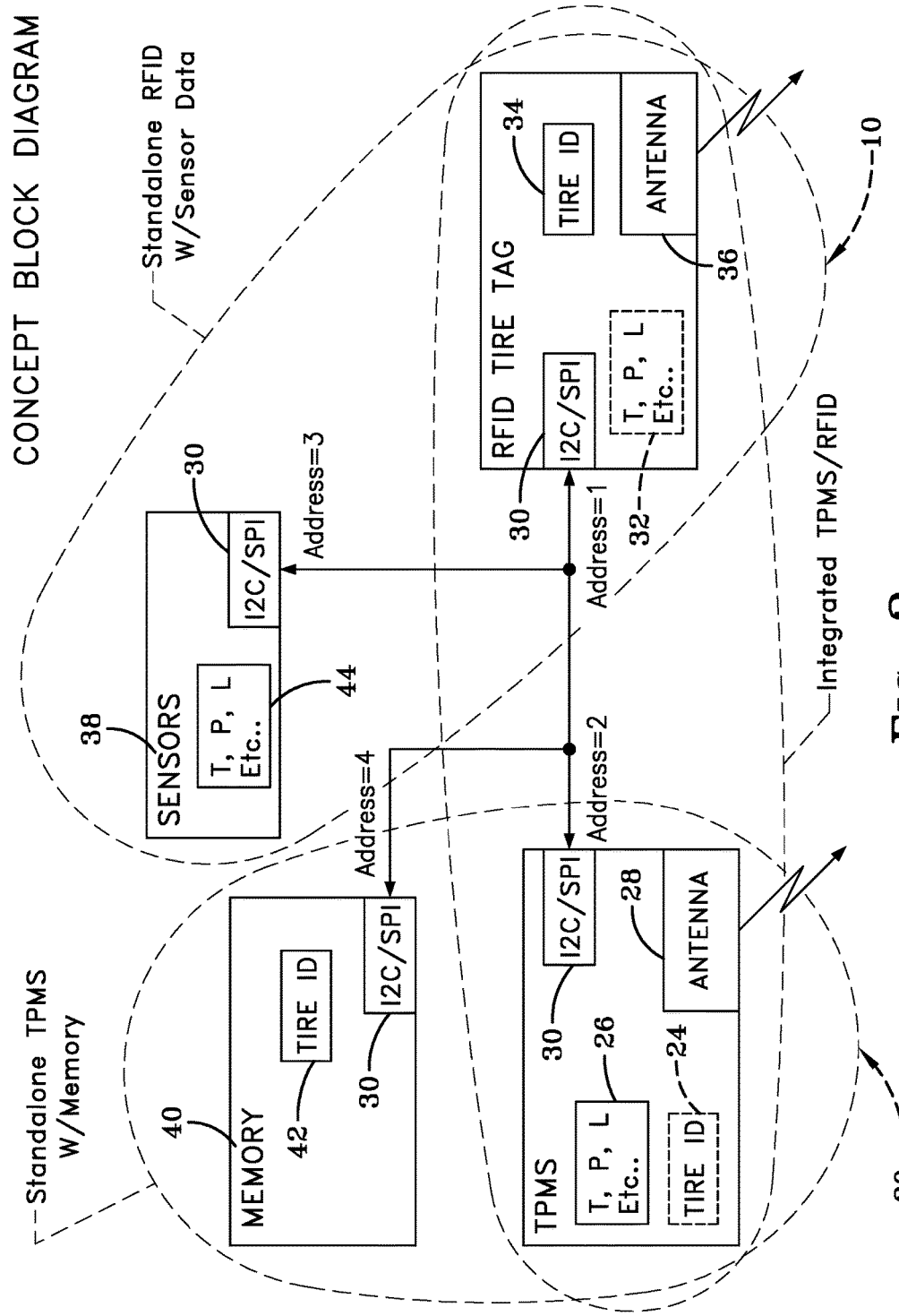
FIG. 2 is a block diagram of a system for integrating TPMS and RFID devices in a tire for data sharing and storage.

Referring to FIG. 2, the subject integrated TPMS module and RFID tag data sharing system is shown in block diagram form. The TPMS module 20 and the RFID tag 10 are standalone devices as seen in FIG. 1 and as represented in the block diagram of FIG. 2. The standalone TPMS module 20 has incorporated into the circuitry data storage memory 40 including storage of the unique tire identification code 42. Accordingly, the TPMS module 20 may be referred to herein as "TPMS with memory". The TPMS module 20 is provided with the tire ID code 24 that is supplied and stored initially as the tire 12 is placed into service. Thereafter, from the RFID tire tag 10 which remains associated with the tire 12 throughout its useful life, the tire ID code can be updated and verified by the TPMS module 20.

In addition, as explained previously, the TPMS module 20 has one or more sensors 26 that monitor and measure tire parameters such as cavity pressure (P), tire temperature (T), and contact patch length (L). Such sensors continuously measure parameters of importance in the operation of the tire and transmit measured tire parameter data to a remote receiver (not shown) by means of an integrated antenna 28. Additionally the TPMS module and the memory 40 have respective unique addresses as part of an interconnection interface 20 that allows for information and data sharing. The interface of preference is an I2C or SPI commercially available for integrated circuit (IC) incorporation and use. "I2C" or "SPI" as used herein represents the inter-integrated circuit (I2C) developed by Philips (now NXP) Semiconductor, Eindhoven, Netherlands, or serial peripheral interface (SPI) developed by Motorola, Schaumberg, Ill., respectfully.

The RFID tire tag 10 is provided with storage 32 for data T, P, L, etc. 32 and for storage of tire ID 34. The tag 10 likewise has an antenna 36 for wirelessly transmitting tire ID and sensor data to a remote receiver (not shown). The RFID tag 10 is equipped with an I2C or SPI interface 30 as well. The tag 10 may further be equipped with its own sensors 38 and T, P, L, etc. 44, communicate and store tire parameter information by means of I2C or SPI shared interface 30. Data generated from sensors 38 may further be communicated to the TPMS module 20. The RFID tag is further packaged to communicate and receive tire parameter measurement from the TPMS sensors 38. Four addresses are shown, all interlinked by means of a common I2C or SPI interface. Sharing of data between all of the four addresses is thus enabled.

One of the major problems currently experienced with TPMS module use in tires is that the unique identifier for a tire/wheel assembly is rendered inapplicable when the TPMS module is removed from the tire/wheel assembly and the unique ID no longer applies to the tire. The system of FIG. 2 remedies the problem by providing communication between the RFID tag 10 and the TPMS module 20 via the I2C or SPI interface. The unique tire ID carried by the RFID tag stays with the tire throughout its useful life. The I2C or SPI interface enabled RFID integrated circuit can be transmitted to the TPMS module 20 and stored, whereby ensuring that the TPMS module 20 is accurately reflecting the tire to which it is attached. Also, the I2C or SPI interface enabled RFID tag 10 IC can obtain temperature, pressure, etc., data from the TPMS module 20 and can then be transmitted by the tag 10. The RFID tag 10 thus has its own standalone temperature, pressure, etc., sensors since the I2C or SPI interface allows multiple device data to be communicated and shared. Also, the memory 40 may be connected to the TPMS module 20 which remains embedded in the tire and holds the applicable unique tire ID.

From the foregoing, it will be appreciated that an integrated sensor module and RFID tag data sharing system is achieved for a tire assembly. The tire is equipped with a RFID tag and with a TPMS module. The RFID tag and the TPMS module communicate with one another. As a result, the tire data from the TPMS module is associated with the permanent tire ID stored in the RFID tag. This is done at the vehicle level and the association may be done automatically. Moreover, the subject system solves the current inability to access TPMS data in a yard using a RFID handheld reader. There are readers that can read both TPMS and RFID but such readers are costly. By associating and sharing data between the TPMS module and the RFID tag, a standard RFID tag reader could access both TPMS data and RFID. The system includes a standalone identification tag 10 mounted to the tire 12 for storing and transmitting an accessible unique tire identification code; a standalone TPMS sensor module 20 mounted to the tire and having one or more sensors for measuring one or more tire parameters and transmitting the measured tire parameter data from the sensor(s); and a data sharing I2C or SPI interface in the identification tag and in the sensor module whereby the unique and correct tire identification code is accessed and stored by the sensor module from data communication with the identification tag. The measured tire parameter data is accessible by the identification tag device for transmission to a remote receiver. The TPMS module 20 is further provided with memory 40 for storing the correct tire ID and tire parameter sensor information. The RFID tag 10 may further have associated sensors 38 that generate tire parameter information for transmission to a remote receiver by the RFID tag 10. The common I2C or SPI interface allows for the free sharing of tire ID and tire parameter sensor measurements between the standalone TPMS module 20 and the RFID tag 10.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly having an integrated system for sharing tire-based information comprising:
    a tire;
    a sensor module mounted to an inner liner of the tire and having at least one sensor for measuring at least one tire parameter, the sensor module operable to transmit measured tire parameter data from the at least one sensor;
    an identification tag device mounted to a sidewall of the tire for storing an accessible unique tire identification code, the identification tag device operable to transmit the stored tire identification code to a remote receiver, and wherein the identification tag device is powered independently of the sensor module and is spaced circumferentially apart from the sensor module on the tire; and
    a bi-directional data sharing interface in the identification tag device and in the sensor module whereby the unique tire identification code is shared between the identification tag device and the sensor module, and the measured tire parameter data is directly accessible by the identification tag device from the sensor module for transmission by the identification tag device to the remote receiver.

2. The tire assembly of claim 1, wherein the measured tire parameter data is accessed and stored by the identification tag device.

3. The tire assembly of claim 1, wherein the sensor module is operable to transmit the tire identification code.

4. The tire assembly of claim 1 wherein the identification tag device comprises at least one tag-based sensor for measuring at least one tag-measured tire parameter, and wherein the identification tag device is operable to transmit measured data from the at least one tag-based sensor to the sensor module through the data sharing interface.

5. The tire assembly of claim 4, wherein the sensor module includes storage memory operable to store the measured data from the at least one tag-based sensor.

6. The tire assembly of claim 1, wherein the bi-directional data sharing interface includes a wired circuit extending between the sensor module and the identification tag device.

7. The tire assembly of claim 6, wherein the wired circuit is at least one of an Inter-Integrated (I2C) circuit and a Serial Peripheral Interface (SPI) circuit.

8. A tire assembly comprising:
    a tire;
    a standalone sensor module mounted to an inner liner of the tire and having at least one sensor for measuring at least one tire parameter, the sensor module operable to transmit measured tire parameter data from the at least one sensor;

a standalone identification tag device mounted to a sidewall of the tire for storing an accessible unique tire identification code, the identification tag device operable to transmit the stored tire identification code to a remote receiver, and wherein the identification tag is powered independently of the sensor module and is spaced circumferentially apart from the sensor module on the tire;

a bi-directional data sharing interface in the identification tag device and in the sensor module whereby the unique tire identification code is accessed and stored by the sensor module from data communication with the identification tag device, and the measured tire parameter data is directly accessible by the identification tag device from the sensor module for transmission by the identification tag device to the remote receiver;

wherein the sensor module is operable to transmit the tire identification code;

wherein the identification tag device comprises at least one tag-based sensor for measuring at least one tag-measured tire parameter, and wherein the identification tag device is operable to transmit measured data from the at least one tag-based sensor to the sensor module through the data sharing interface; and wherein the sensor module includes storage memory operable to store the measured data from the at least one tag-based sensor.

9. The tire assembly of claim 8, wherein the measured tire parameter data is accessed and stored by the identification tag device.

10. The tire assembly of claim 8, wherein the bi-directional data sharing interface includes a wired circuit extending between the sensor module and the identification tag device.

11. The tire assembly of claim 10, wherein the wired circuit is at least one of an Inter-Integrated (I2C) circuit and a Serial Peripheral Interface (SPI) circuit.

* * * * *